US012801556B2

United States Patent
Dhogale et al.

(12) United States Patent
(10) Patent No.: US 12,801,556 B2
(45) Date of Patent: Nov. 17, 2026

(54) OPTIMIZATION OF PIPELINE COMMUNICATION BUSES IN DATA TRANSFER ARCHITECTURES

(71) Applicant: QUALCOMM Incorporated, San Diego, CA (US)

(72) Inventors: Vivek Dhogale, Bangalore (IN); Raashid Moin Shaikh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 19/063,039

(22) Filed: Feb. 25, 2025

(65) Prior Publication Data

US 2026/0252516 A1 Aug. 27, 2026

(51) Int. Cl.
*G06F 13/42* (2006.01)

(52) U.S. Cl.
CPC .......... *G06F 13/42* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 5,359,715 A * | 10/1994 | Heil | G06F 13/24 710/312 |
| 6,253,269 B1 * | 6/2001 | Cranston | G06F 13/36 710/240 |
| 8,923,131 B2 * | 12/2014 | Danzig | H04L 12/2801 370/235 |
| 9,262,359 B1 | 2/2016 | Noice et al. | |
| 12,405,908 B2 * | 9/2025 | Pothula | G06F 3/0683 |
| 2004/0010652 A1 | 1/2004 | Adams et al. | |
| 2004/0199705 A1 | 10/2004 | Phelps et al. | |
| 2024/0126444 A1 * | 4/2024 | Ahn | G06F 3/0613 |
| 2026/0046258 A1 * | 2/2026 | Hsu | G06F 13/18 |

OTHER PUBLICATIONS

International Search Report and Written Opinion—PCT/US2026/011467—ISA/EPO—Apr. 24, 2026.

* cited by examiner

*Primary Examiner* — Elias Mamo
(74) *Attorney, Agent, or Firm* — Patterson + Sheridan LLP

(57) ABSTRACT

Techniques described herein focus on resource sharing (e.g., sharing of some communication buses) and intelligent routing of data between a source device and multiple destination devices to improve data transfer efficiency. For example, the techniques proposed herein describe the use of a combination of merged pipeline communication buses and separate pipeline communication buses for transfer of the data between the source device and the multiple destination devices.

19 Claims, 10 Drawing Sheets

OPTIMIZATION OF PIPELINE COMMUNICATION BUSES IN DATA TRANSFER ARCHITECTURES

BACKGROUND

Field of the Disclosure

Aspects of the present disclosure relate to techniques for managing optimization of pipeline communication buses being used in data transfer architectures.

Description of Related Art

A processor is a primary component of a computer that performs most of processing. The processor is often referred to as a brain of the computer because the processor handles execution of instructions from programs, processes data, and controls other parts of the computer.

Data transfer between the processor and a storage element such as a memory of the computer is a crucial aspect of computer architecture, enabling the execution of the programs and retrieval/storage of the data. The data transfer process involves multiple components such as buses, caches, and memory controllers.

The data moves between the processor and the memory using one or more communication buses such as an address bus, a data bus, and a control bus. The address bus may specify a memory location to read from or write to. The data bus may transfer actual data between the processor and the memory. The control bus may signal read/write operations and synchronizes the transfer of the data between the processor and the memory.

For read (e.g., the memory to the processor) operation, the processor may check the memory. If the data is present, the data is immediately accessed by the processor with a minimal latency. If the requested data is not in the memory, the processor may send a memory read request with an address via the address bus to the memory. A memory controller decodes the address and fetches the required data from the memory. The data is sent back via the data bus to the processor.

For write (e.g., the processor to the memory) operation, the processor may write the data to the memory. In some cases, the processor may write the data only to a cache first. The modified data is then written to the memory only when necessary.

To improve data transfer performance in multi-processor and multi-memory systems including one or more processors and one or more memories, data transfer architectures may use pipeline communication buses (e.g., between the one or more processors and the one or more memories) to enable multiple memory accesses to occur in parallel through stages such as a request phase, an address phase, a data transfer phase, and a completion phase. In the request phase, a processor may send a read/write request with an address of the one or more memories. In the address phase, a memory controller may decode the address of the one or more memories. In the data transfer phase, the data may move through the pipeline communication buses connecting the processor to the one or more memories. In the completion phase, the processor acknowledges receipt or completion of the write operation of the data to the one or more memories.

SUMMARY

One aspect provides a method for including connecting a first device to one or more node points between the first device and a plurality of second devices via one or more merged pipeline communication buses, connecting the one or more node points to the plurality of second devices via separate pipeline communication buses, and performing communication between the first device and the plurality of second devices via the one or more merged pipeline communication buses and the separate pipeline communication buses.

Other aspects provide: an apparatus operable, configured, or otherwise adapted to perform the aforementioned method as well as those described elsewhere herein; a non-transitory, computer-readable media comprising instructions that, when executed by one or more processors of an apparatus, cause the apparatus to perform the aforementioned method as well as those described elsewhere herein; a computer program product embodied on a computer-readable storage medium comprising code for performing the aforementioned method as well as those described elsewhere herein; and an apparatus comprising means for performing the aforementioned method as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
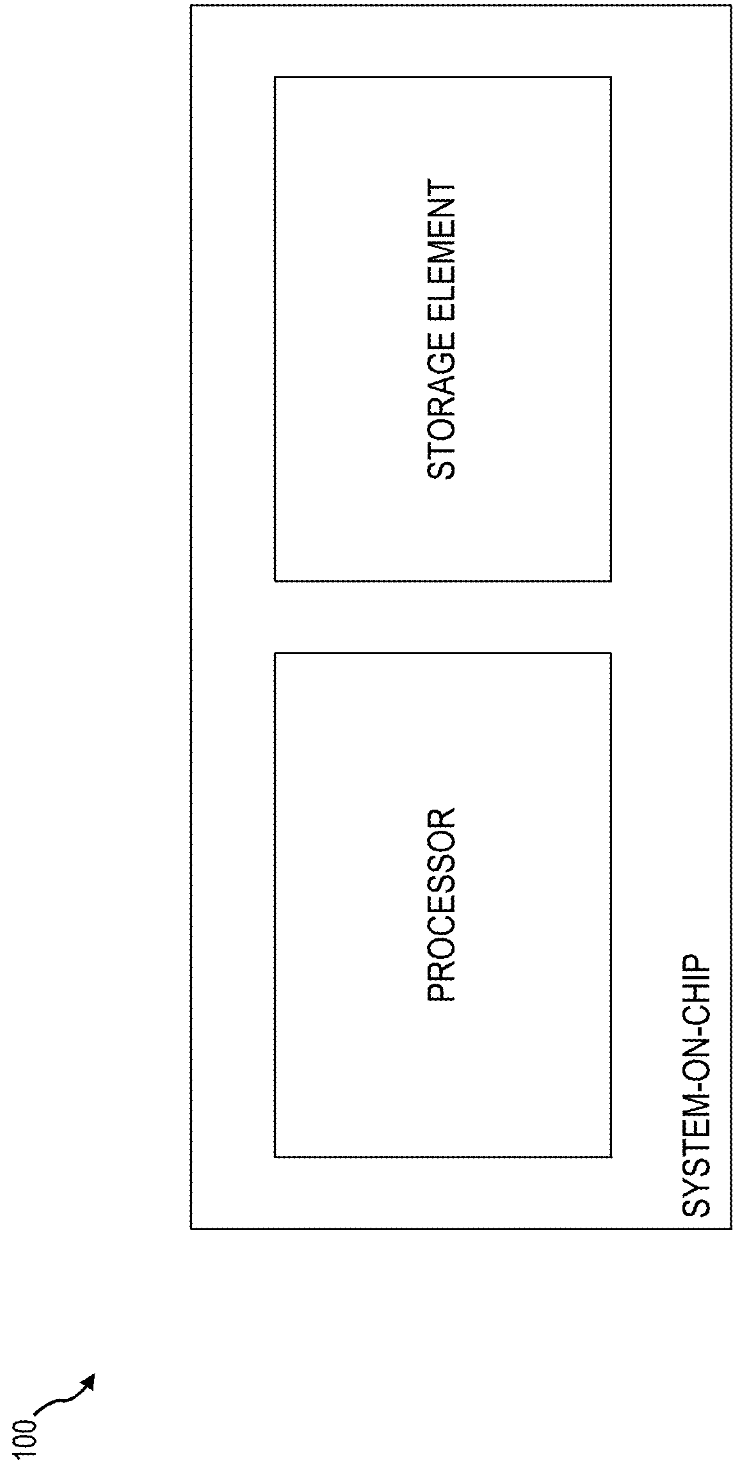
FIG. 1 depicts an example system-on-chip (SoC), in accordance with certain aspects of the present disclosure.
Figure 2:
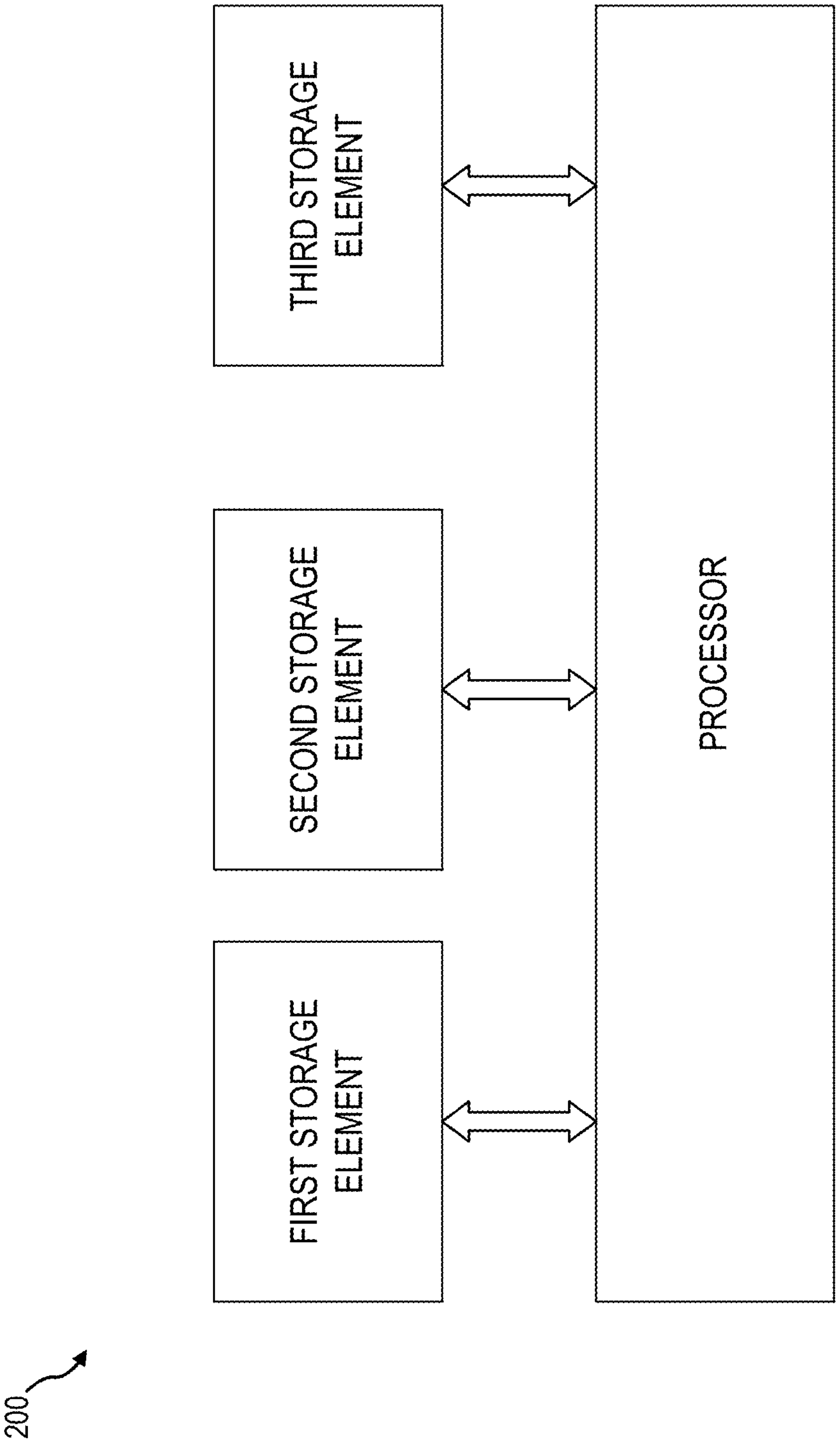
FIG. 2 depicts example communication between a processor and multiple storage elements, in accordance with certain aspects of the present disclosure.
Figure 3:
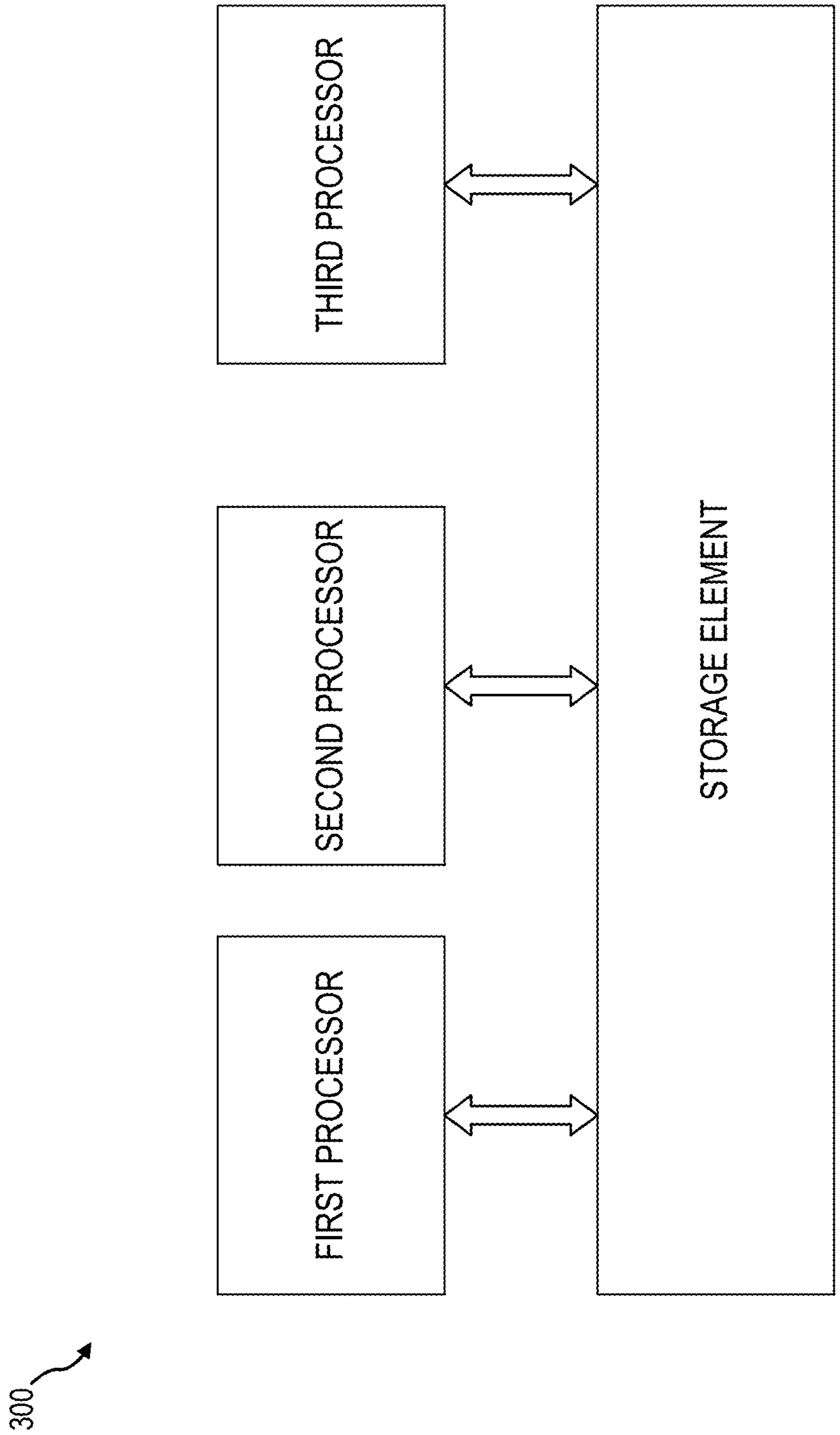
FIG. 3 depicts example communication between multiple processors and a storage element, in accordance with certain aspects of the present disclosure.

A bus may be a system of communication pathways (e.g., wires) used to transfer data between different components in a computer or between systems. A pipeline may be a series of stages through which the data passes, with each stage performing a specific part of a task. The goal is to process the data in stages and allow different stages to run concurrently.

A pipeline communication bus combines the idea of the bus (for communication) with pipeline processing (for efficiency). In this setup, the data is transferred between different components in a sequence of stages. For example, pipeline communication buses in data transfer architectures may refer to structured, sequential data transfer mechanisms that facilitate efficient communication between components such as processors, storage elements (e.g., memories), and peripheral devices. The use of the pipeline communication buses may enhance throughput and reduce latency in data exchanges between the components such as the processors, the storage elements, and the peripheral devices.

In pipeline communication bus architectures, high speed data transfer from a source device (e.g., a processor) to different destination devices (e.g., different storage elements) may require multiple separate pipeline communication buses configured for the different destination devices from the source device. However, this comes at a cost in terms of area, power consumption, and complexity.

For example, in some pipeline communication bus architectures, each pipeline communication bus from the source device may be dedicated to or configured for a single destination device. If the source device needs to send data to multiple destination devices, the source device must maintain a separate pipeline communication bus for each destination device (e.g., N number of separate pipeline communication buses for N number of destination devices). So, as a number of destination devices increases, an area occupied by routing and pipeline communication bus resources grows linearly.

Also, each pipeline communication bus may include one or more flip-flops to store and transfer the data in different pipeline stages. So, the use of more number of the pipeline communication buses (e.g., for the multiple destination devices) may imply the use of more number of flip-flops. This may result in more leakage power. For example, the leakage power is a major issue because the flip-flops may leak small amounts of current even when idle. This issue is worsened when many unused pipeline communication buses still consume power. Accordingly, increased number of flip-flops increases static power leakage, making a computer system using these pipeline communication buses inefficient in terms of power consumption.

Additionally, if the number of destination devices grows in the computer system, the pipeline communication bus count scales linearly, which increases wiring congestion and increases data transmission delay due to longer interconnects between the source device and the multiple destination devices.

To address the challenges of the large area consumption (e.g., by the pipeline communication buses) and the high leakage power in the pipeline communication bus architectures, several optimization techniques can be employed. These techniques focus on resource sharing (e.g., sharing of some communication buses) and intelligent routing (e.g., of the data between the source device and the multiple destination devices) to improve efficiency while maintaining the high speed data transfer. For instance, instead of only using the separate pipeline communication buses configured for the different destination devices from the source device, techniques proposed herein describe the use of a combination of merged pipeline communication buses and the separate pipeline communication buses for transfer of data between the source device and the different destination devices.

For example, the source device may have to send data to four different destination devices. Instead of using four separate pipeline communication buses for the four different destination devices from a start, initially, the source device transmits the data for the four destination devices over a single merged pipeline communication bus up to a certain node point. Beyond this node point, the single merged pipeline communication bus may split into the four separate pipeline communication buses. Each of the four separate pipeline communication buses may then carry the data for a specific destination device among the four destination devices.

The techniques proposed herein may reduce routing congestion and area consumption by the communication buses. For example, instead of using the separate pipeline communication buses from the beginning, the single merged pipeline communication bus may be used initially, reducing an overall number of wires and switches needed by the communication buses in the early stages. Also, since flip-flops are needed for each separate pipeline communication bus, merging pipeline communication buses early reduces a number of required pipeline flip-flops, and thereby lowering leakage power.

The techniques proposed herein may be further understood with reference to FIG. 1-FIG. 10.

Example System-On-Chip (SoC)

FIG. 1 depicts an example system-on-chip (SoC) 100 with a processor and a storage element (e.g., such as a memory).

The processor is the brain of a computer. The processor is responsible for executing instructions that make programs run. The processor handles calculations, logic, and manages data flow between various parts of the computer. The processor interprets and processes commands from programs, operating systems, and other hardware. The processor has several components, such as cores (the more cores, the more tasks the processor can handle simultaneously) and a clock speed controller (to manage how fast the processor can process the instructions).

The storage element is temporary storage area that the computer uses to store data that is actively being used or processed by the processor. The storage element provides quick access to data that the programs need right away. When a program is opened, it gets loaded into the storage element so the processor can access the program rapidly.

Example Storage Element Systems

There are different types of storage element systems used in multiprocessing environments of a computer or an electronic device. The different types of storage element systems may include distributed storage element systems and shared storage element systems.

In a distributed storage element system, each processor may have its own storage element, and there is no shared storage element pool between different processors. The processors may communicate with each other over a network to exchange data. The data cannot be directly accessed by other processors. To share the data, the processors must explicitly send messages to each other via the network. When one processor needs the data from another processor, the processor may send a message to the other processor, which retrieves the data from its local storage element and sends it back. Synchronization in the distributed storage element systems may be more complicated because the data needs to be communicated explicitly between the processors. Protocols and algorithms may be used to manage consistency and synchronization.

In a shared storage element system, all processors may have access to a same storage element. This means that all of the processors may directly read from or write to this common storage element. It may be like a single storage pool where all of the processors may store or retrieve data. Each processor may have its own local cache to speed up storage element access. However, all of the processors may rely on the shared storage element to exchange the data. Since multiple processors may have copies of the same data in their local caches, a mechanism like cache coherence protocols may ensure that when one processor changes the data, other processors are updated or informed to avoid inconsistencies.

Example Data Transfer Architectures

In one-to-many or many-to-one data transfer architectures, pipeline communication bus structures may refer to a series of steps or stages through which data flows from one point to another, often involving processing, transformation, and/or routing of the data. The pipeline communication bus structures may be used to efficiently manage and streamline a flow of the data in systems where there are multiple sources and/or destinations.

In a one-to-many data transfer setup, a single source device sends the data to multiple destination devices. For example, as illustrated in a diagram 200 of FIG. 2, a single processor writes the data to multiple (e.g., three) storage elements (e.g., multiple memory banks). A pipeline communication bus structure in the one-to-many data transfer setup may consist of several stages such as an input stage, a processing stage, a routing/distribution stage, and an output stage. In the input stage, the data is ingested from a single source device. In the processing stage, the data might be transformed, filtered, or aggregated based on the needs of recipients. In the routing/distribution stage, the data is divided or directed to the appropriate destination devices. In the output stage, the data reaches the individual destination devices (such as memory banks or end-user applications).

In a many-to-one data transfer setup, the data from multiple source devices may be aggregated or directed to a single destination device. For example, as illustrated in a diagram 300 of FIG. 3, multiple (e.g., three) processors read/write to a single storage element (e.g., a memory bank). That is, the single storage element is being shared by the multiple processors. A pipeline communication bus structure in the many-to-one data transfer setup may consist of several stages such as an input stage, a pre-processing stage, an aggregation stage, a routing stage, and an output stage. In the input stage, multiple data streams or source devices may send data into one or more pipeline communication buses. In the pre-processing stage, each incoming data stream may be processed individually (e.g., cleaned, normalized, or transformed) before entering a main pipeline communication bus. In the aggregation stage, the data from multiple source devices may be aggregated, which could involve combining, merging, or summarizing data based on certain criteria or logic. In the routing stage, the data is then directed or routed towards a final destination device. In the output stage, the final data reaches a central destination device.

Example Data Transfer Between Processors and Storage Elements

Processor operations in electronic systems involves fetching data from storage elements to perform certain logical or arithmetic operations and then storing the data back into the storage elements. To improve a throughput of such processor operations, pipeline communication bus structures may be employed. The pipeline communication bus structures may branch out towards the storage elements (e.g., which may be destination devices) from the processor (e.g., which may be a source device).

A source device is the origin of the data in a communication or data transfer process. The source device generates, stores, or transmits the data that needs to be sent to another device. A destination device is an endpoint that receives the transmitted data from the source device. The destination device processes, stores, or displays the received data.

Figure 4:
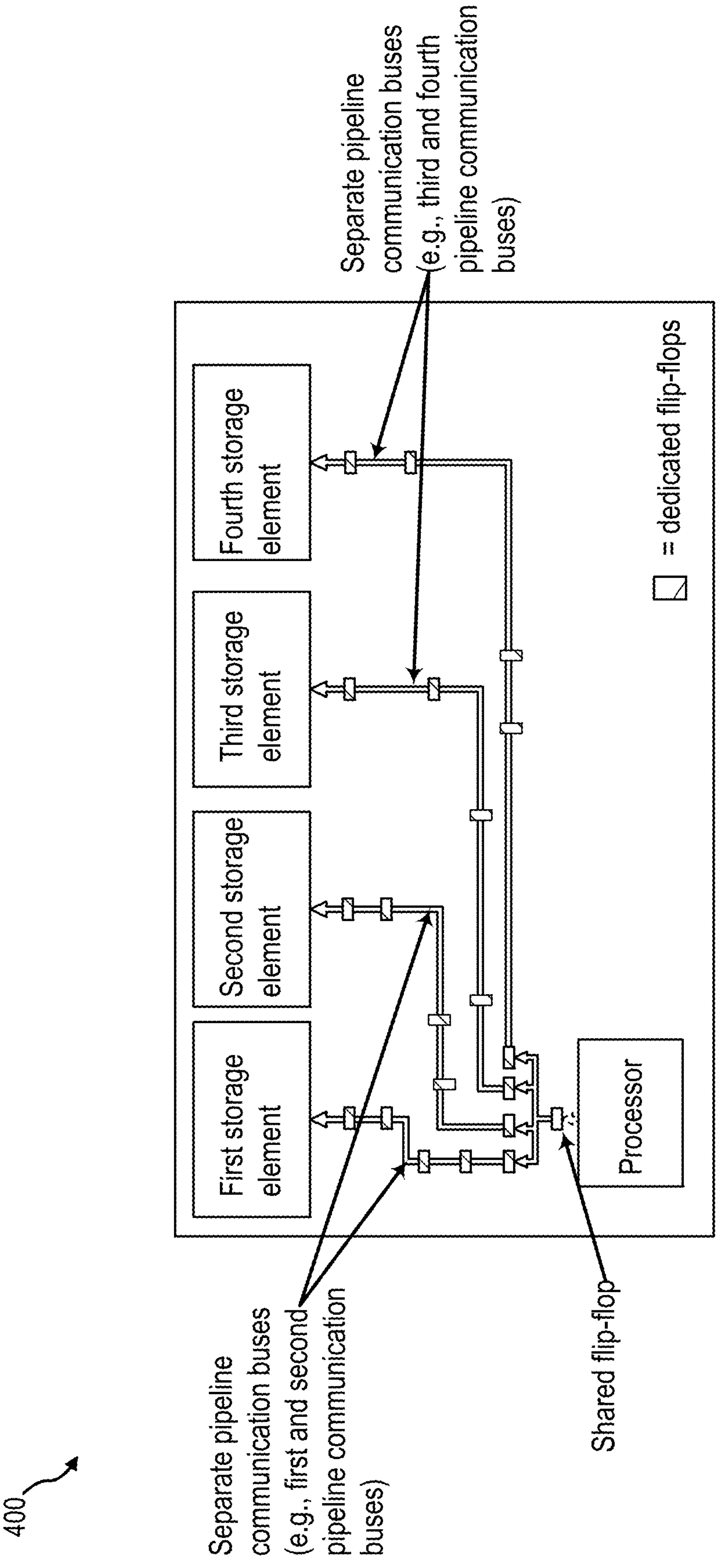
FIG. 4 depicts example communication between a processor and multiple storage elements via separate pipeline communication buses, in accordance with certain aspects of the present disclosure.

FIG. 4 depicts a diagram 400 showing communication between a processor and multiple storage elements via separate pipeline communication buses. As depicted, the processor communicates with the multiple storage elements via the separate pipeline communication buses corresponding to the multiple storage elements. The processor may be connected to the separate pipeline communication buses for the multiple storage elements via a shared bus having a shared flip-flop.

The processor may communicate with a first storage element via a first pipeline communication bus. The first pipeline communication bus may be a dedicated bus configured for the first storage element. For example, the first pipeline communication bus may carry data from the processor that is intended for the first storage element only. The first pipeline communication bus may also carry the data from the first storage element to the processor.

The processor may communicate with a second storage element via a second pipeline communication bus. The second pipeline communication bus may be a dedicated bus configured for the second storage element. For example, the second pipeline communication bus may carry data from the processor that is intended for the second storage element only. The second pipeline communication bus may also carry the data from the second storage element to the processor.

The processor may communicate with a third storage element via a third pipeline communication bus. The third pipeline communication bus may be a dedicated bus configured for the third storage element. For example, the third pipeline communication bus may carry data from the processor that is intended for the third storage element only. The third pipeline communication bus may also carry the data from the third storage element to the processor.

The processor may communicate with a fourth storage element via a fourth pipeline communication bus. The fourth pipeline communication bus may be a dedicated bus configured for the fourth storage element. For example, the fourth pipeline communication bus may carry data from the processor that is intended for the fourth storage element only. The fourth pipeline communication bus may also carry the data from the fourth storage element to the processor.

The first pipeline communication bus, the second pipeline communication bus, the third pipeline communication bus, and the fourth pipeline communication bus may be associated with one or more flip-flops (e.g., which may dedicated flip-flops configured for each of the separate pipeline communication buses).

Figure 5:
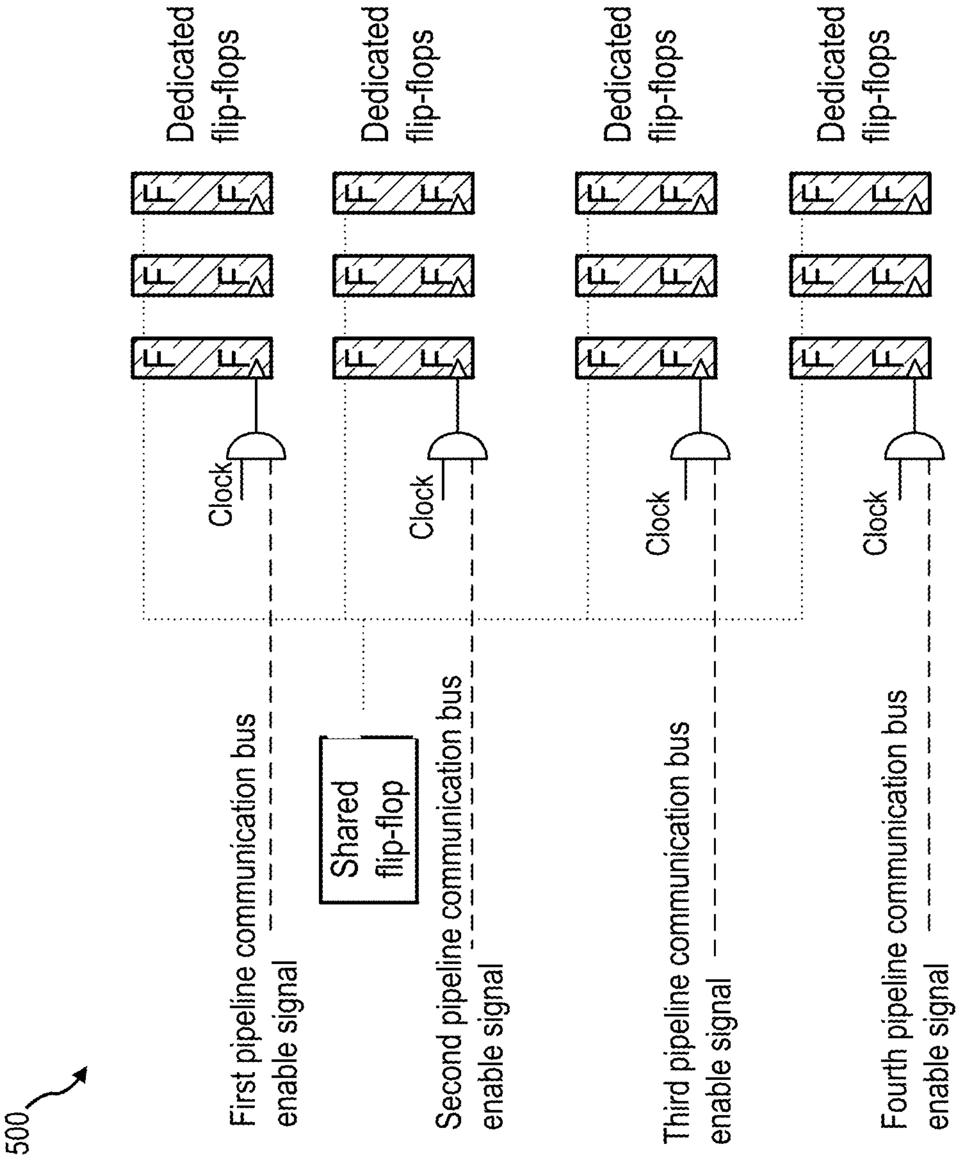
FIG. 5 depicts example use of dedicated flip-flops configured on separate pipeline communication buses used for communication between a processor and multiple storage elements, in accordance with certain aspects of the present disclosure.

A diagram 500 of FIG. 5 shows multiple dedicated flip-flops that are associated with (or that may receive) a first pipeline communication bus enable signal associated with a first pipeline communication bus, a second pipeline communication bus enable signal associated with a second pipeline communication bus, a third pipeline communication bus enable signal associated with a third pipeline communication bus, and a fourth pipeline communication bus enable signal associated with a fourth pipeline communication bus. One or more different clocks or clock signals may be used to enable the dedicated flip-flops associated with each of the first pipeline communication bus, the second pipeline communication bus, the third pipeline communication bus, and the fourth pipeline communication bus. For example, when data has to be sent via the first pipeline communication bus, the one or more clocks and/or the first pipeline communication bus enable signal may be used to enable the dedicated flip-flops associated with the first pipeline communication bus. In another example, when the data has to be sent via the second pipeline communication bus, the one or more clocks and/or the second pipeline communication bus enable signal may be used to enable the dedicated flip-flops associated with the second pipeline communication bus. In another example, when the data has to be sent via the third pipeline communication bus, the one or more clocks and/or the third pipeline communication bus enable signal may be used to enable the dedicated flip-flops associated with the third pipeline communication bus. In another example, when the data has to be sent via the fourth pipeline communication bus, the one or more clocks and/or the fourth pipeline communication bus enable signal may be used to enable the dedicated flip-flops associated with the fourth pipeline communication bus.

Figure 6:
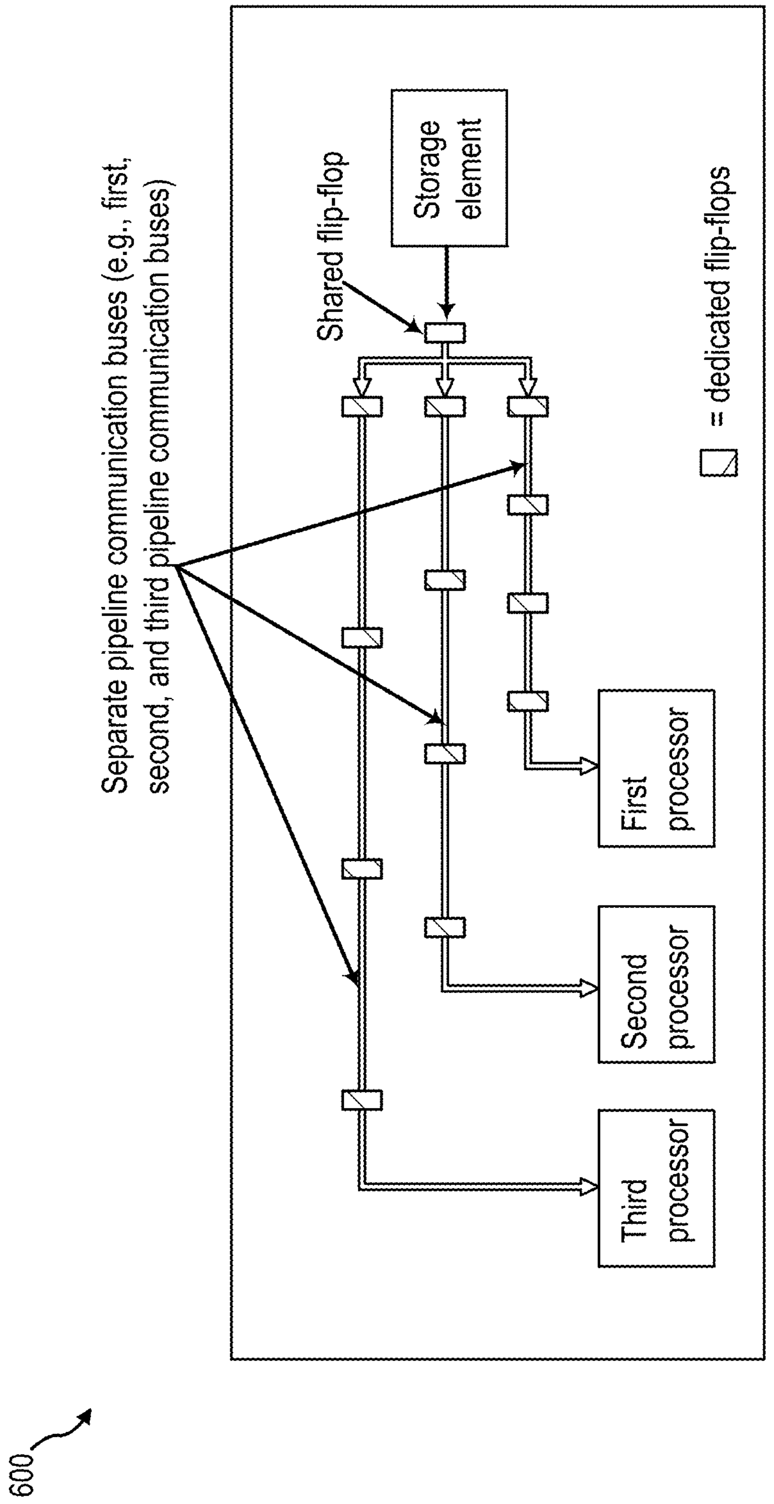
FIG. 6 depicts example communication between a storage element and multiple processors via separate pipeline communication buses, in accordance with certain aspects of the present disclosure.

FIG. 6 depicts a diagram 600 showing communication between a storage element and multiple processors via separate pipeline communication buses. As depicted, the storage element communicates with the multiple processors via the separate pipeline communication buses corresponding to the multiple processors. The storage element may be connected to the separate pipeline communication buses for the multiple processors via a shared bus having a shared flip-flop.

The storage element communicates with a first processor via a first pipeline communication bus. The first pipeline communication bus may be a dedicated bus configured for the first processor. For example, the first pipeline communication bus may carry data from the storage element that is intended for the first processor only. The first pipeline communication bus may also carry the data from the first processor to the storage element.

The storage element communicates with a second processor via a second pipeline communication bus. The second pipeline communication bus may be a dedicated bus configured for the second processor. For example, the second pipeline communication bus may carry data from the storage element that is intended for the second processor only. The second pipeline communication bus may also carry the data from the second processor to the storage element.

The storage element communicates with a third processor via a third pipeline communication bus. The third pipeline communication bus may be a dedicated bus configured for the third processor. For example, the third pipeline communication bus may carry data from the storage element that is intended for the third processor only. The third pipeline communication bus may also carry the data from the third processor to the storage element.

The first pipeline communication bus, the second pipeline communication bus, and the third pipeline communication bus may include one or more flip-flops (e.g., which may dedicated flip-flops configured for each of the separate pipeline communication buses).

Example Techniques for Managing Optimization of Pipeline Communication Buses being Used in Data Transfer Architectures Techniques proposed herein describe the use of a combination of merged pipeline communication buses and separate pipeline communication buses for transfer of data from a source device to different destination devices.

A source device is the origin of the data in a communication or data transfer process. The source device generates, stores, or transmits the data that needs to be sent to another device. A destination device is an endpoint that receives the transmitted data from the source device. The destination device processes, stores, or displays the received data.

A pipeline communication bus is a type of bus architecture used in computing systems to improve data transfer efficiency by breaking down a communication process into multiple stages. For example, instead of transferring an entire message in one step, the transfer may be split into multiple pipeline stages. Each pipeline stage processes part of the data and passes it to the next stage.

In an example case, the source device may have to send the data to two destination devices. Instead of using two separate pipeline communication buses for sending the data to the two destination devices from a start, initially, the source device may transmit the data for the two destination devices over a single merged pipeline communication bus up to a certain node point. Beyond this node point, the single merged pipeline communication bus may split into the two separate pipeline communication buses for the two destination devices. Each separate pipeline communication bus may then carry the data for a specific destination device among the two destination devices.

The techniques proposed herein may provide efficient resource utilization. For example, instead of having two fully separate pipeline communication buses from the source device from the start, this architecture reduces redundancy by sharing transmission lines up to a certain node point. The techniques proposed herein may also reduce overall length of pipeline communication buses needed to carry data from the source device to the destination devices. Furthermore, by merging data pipelines before splitting at the node point, this design saves area needed for the pipeline communication buses and wiring complexity in hardware layouts (e.g., which may also result in reduced routing congestion).

Figure 7:
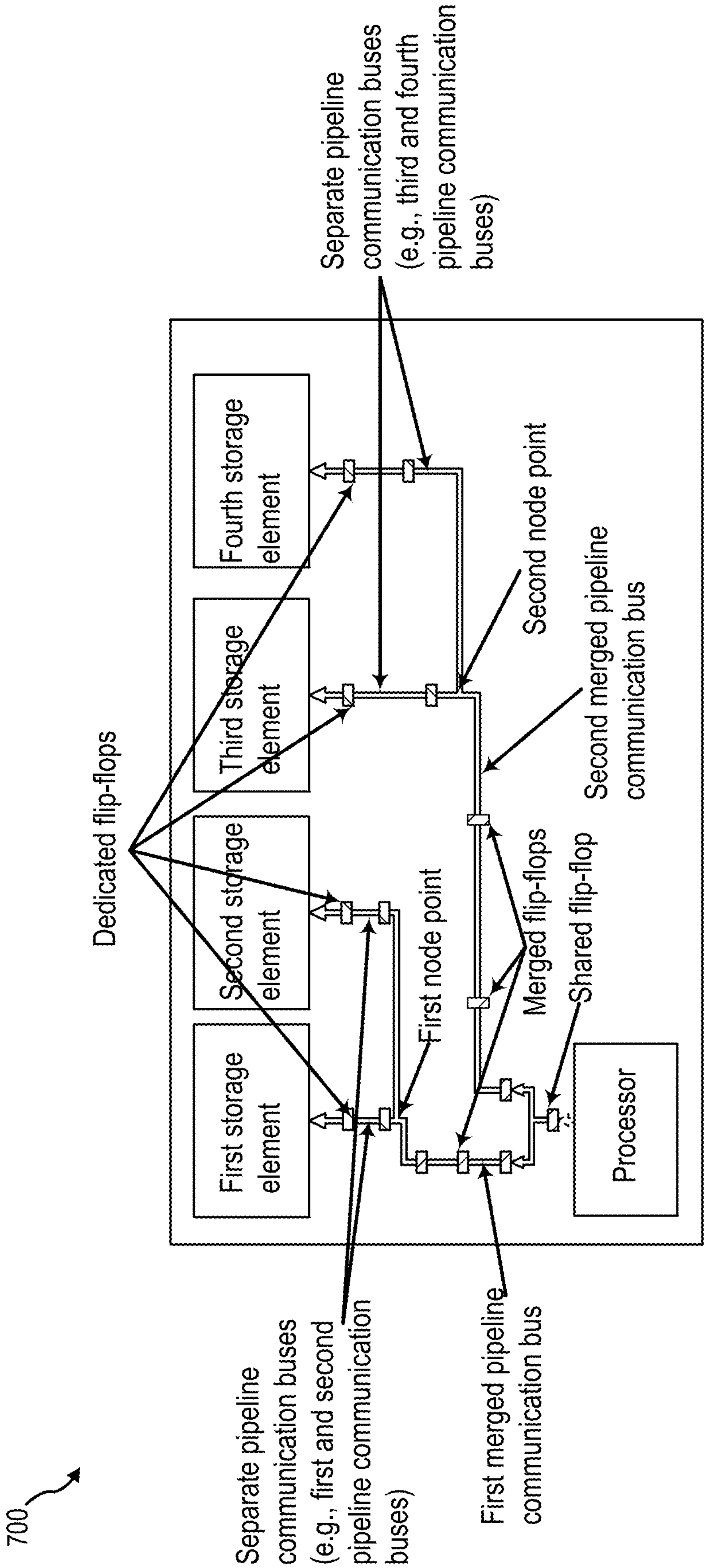
FIG. 7 depicts example communication between a processor and multiple storage elements via merged pipeline communication buses and separate pipeline communication buses, in accordance with certain aspects of the present disclosure.

FIG. 7 depicts a diagram 700 showing example communication between a processor and multiple storage elements via merged pipeline communication buses and separate pipeline communication buses.

The processor is connected to a first merged pipeline communication bus and a second merged pipeline communication bus via a shared bus having a shared flip-flop. The first merged pipeline communication bus may carry first data for a first storage element and second data for a second storage element from the processor. The second merged pipeline communication bus may carry third data for a third storage element and fourth data for a fourth storage element from the processor.

The first merged pipeline communication bus may carry the first data and the second data up to a first node point. In one aspect, a location of the first node point may be based on location information of the first storage element and the second storage element with respect to the processor. In another aspect, the location of the first node point may be based on location information of all storage elements with respect to the processor. In another aspect, the location of the first node point may be based on a number of all storage elements and location information of all storage elements with respect to the processor. Beyond the first node point, the first merged pipeline communication bus may split into a first pipeline communication bus configured for the first storage element and a second pipeline communication bus configured for the second storage element. The first pipeline communication bus may carry the first data to the first storage element. The second pipeline communication bus may carry the second data to the second storage element.

The second merged pipeline communication bus may carry the third data and the fourth data up to a second node point. In one aspect, a location of the second node point may be based on location information of the third storage element and the fourth storage element with respect to the processor. In another aspect, the location of the second node point may be based on location information of all storage elements with respect to the processor. In another aspect, the location of the second node point may be based on a number of all storage elements and location information of all storage elements with respect to the processor. Beyond the second node point, the second merged pipeline communication bus may split into a third pipeline communication bus configured for the third storage element and a fourth pipeline communication bus configured for the fourth storage element. The third pipeline communication bus may carry the third data to the third storage element. The fourth pipeline communication bus may carry the fourth data to the fourth storage element.

A merged pipeline communication bus may be based on merging of different pipeline communication buses. One or more algorithms may be implemented to merge the different pipeline communication buses to form the merged pipeline communication bus.

In one example, the first merged pipeline communication bus, as shown in FIG. 7, may be based on merging of certain portions of the first pipeline communication bus and the second pipeline communication bus (as shown in FIG. 4). For instance, a full length of the first pipeline communication bus and the second pipeline communication bus (as shown in FIG. 4) may be converted into the first merged pipeline communication (e.g., based on merging of certain portions of the first pipeline communication bus and the second pipeline communication bus as shown in FIG. 4) and a reduced length of the first pipeline communication bus and the second pipeline communication bus (as shown in FIG. 7).

In another example, the second merged pipeline communication bus, as shown in FIG. 7, may be based on merging of certain portions of the third pipeline communication bus and the fourth pipeline communication bus (as shown in FIG. 4). For instance, a full length of the third pipeline communication bus and the fourth pipeline communication bus (as shown in FIG. 4) may be converted into the second merged pipeline communication (e.g., based on merging of certain portions of the third pipeline communication bus and the fourth pipeline communication bus as shown in FIG. 4) and a reduced length of the third pipeline communication bus and the fourth pipeline communication bus (as shown in FIG. 7).

In one aspect, a fine grained merging process may be implemented to generate a merged pipeline communication bus based on a number of storage elements, locality of nodes within the storage elements, and/or one or more buses communicating between the processors and the storage elements. In another aspect, a fine grained merging process may be implemented to generate a merged pipeline communication bus based on locality of partitions on the one or more buses communicating between the processors and the storage elements.

The first pipeline communication bus, the second pipeline communication bus, the third pipeline communication bus, and the fourth pipeline communication bus may be associated one or more flip-flops (e.g., which may dedicated flip-flops configured for each pipeline communication bus and merged flip-flops configured for at least two different pipeline communication buses).

Figure 8:
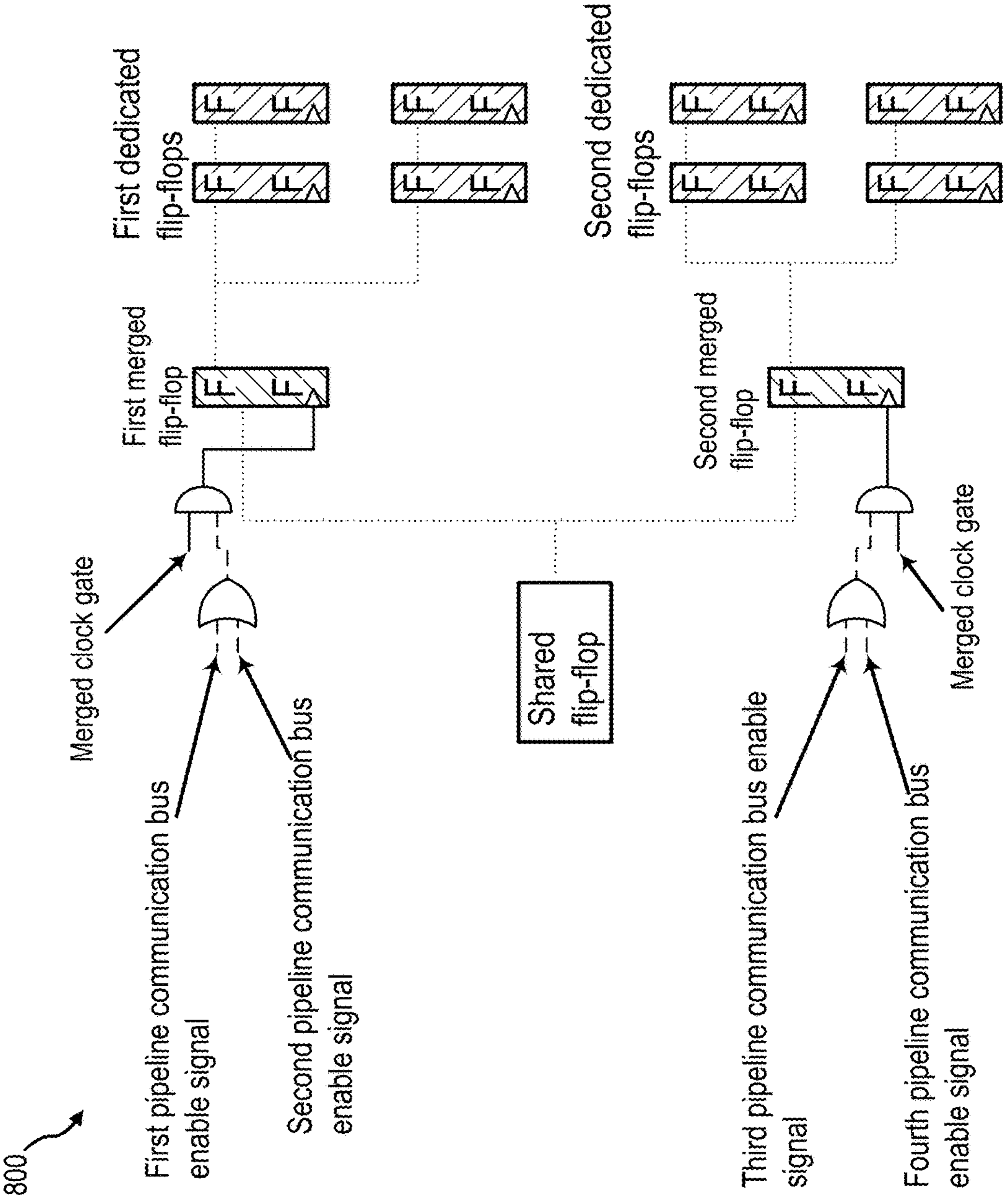
FIG. 8 depicts example use of dedicated flip-flops configured on separate pipeline communication buses and merged flip-flops configured on merged pipeline communication buses used for communication between a processor and multiple storage elements, in accordance with certain aspects of the present disclosure.

A diagram 800 of FIG. 8 shows a first pipeline communication bus enable signal (e.g., associated with a first pipeline communication bus) and a second pipeline communication bus enable signal (e.g., associated with a second pipeline communication bus) for a first merged flip-flop and first dedicated flip-flops. Similarly, a third pipeline communication bus enable signal (e.g., associated with a third pipeline communication bus) and a fourth pipeline communication bus enable signal (e.g., associated with a fourth pipeline communication bus) are for a second merged flip-flop and second dedicated flip-flops. For example, when data has to be sent via the first pipeline communication bus and/or the second pipeline communication bus, one or more merged clocks (e.g., a merged clock gate), the first pipeline communication bus enable signal, and/or the second pipeline communication bus enable signal may be used to enable the first merged flip-flop and the first dedicated flip-flops associated with both the first pipeline communication bus and the second pipeline communication bus. In another example, when the data has to be sent via the third pipeline communication bus and/or the fourth pipeline communication bus, one or more merged clocks (e.g., a merged clock gate), the third pipeline communication bus enable signal, and/or the fourth pipeline communication bus enable signal may be used to enable the second merged flip-flop and the second dedicated flip-flops associated with both the third pipeline communication bus and the fourth pipeline communication bus.

Figure 9:
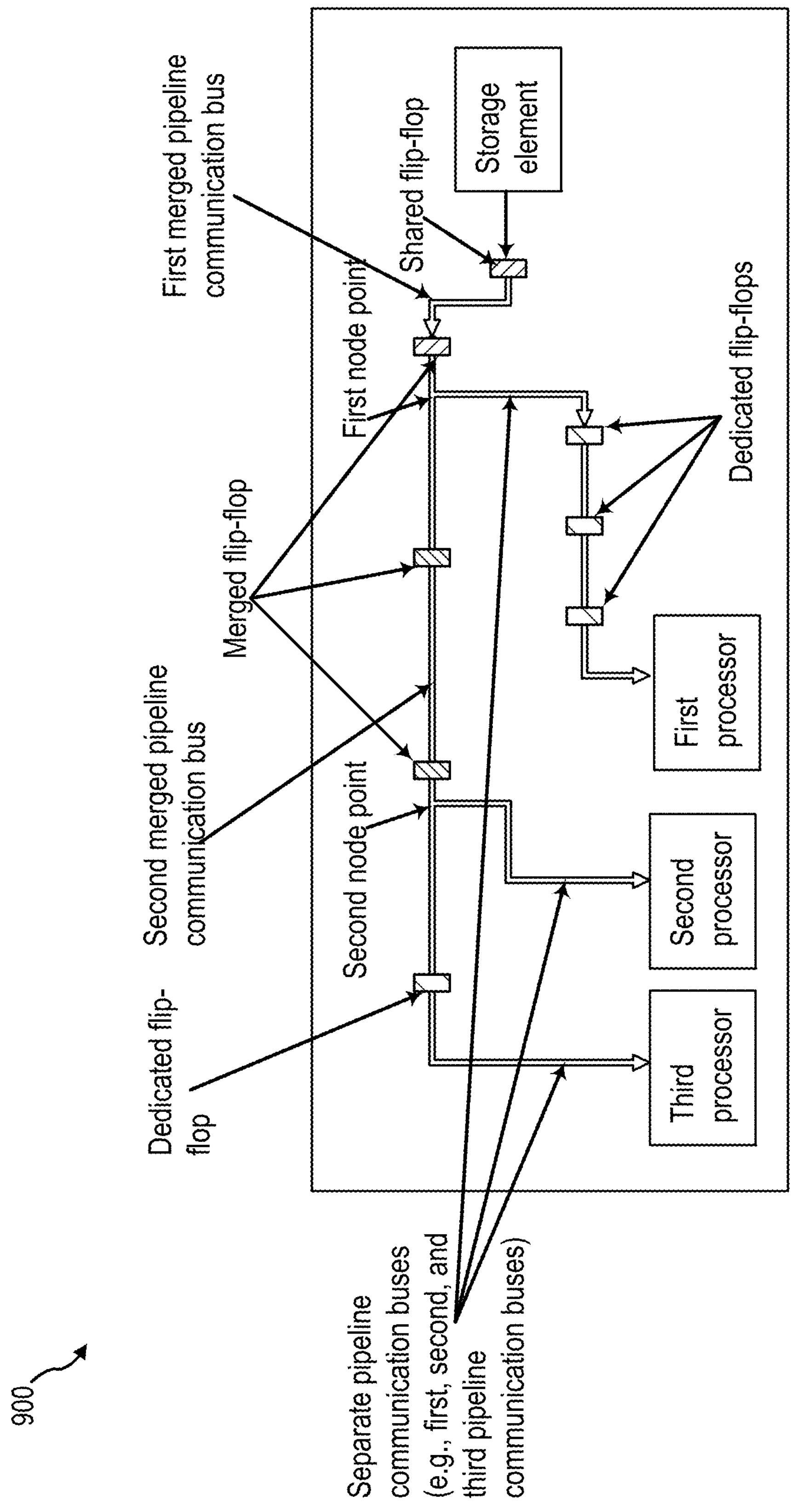
FIG. 9 depicts example communication between a storage element and multiple processors via merged pipeline communication buses and separate pipeline communication buses, in accordance with certain aspects of the present disclosure.

FIG. 9 depicts a diagram 900 showing communication between a storage element and multiple processors via merged pipeline communication buses and separate pipeline communication buses.

The storage element is connected to a first merged pipeline communication bus via a shared bus having a shared flip-flop. The first merged pipeline communication bus may carry first data for a first processor, second data for a second processor, and third data for a third processor from the storage element.

The first merged pipeline communication bus may carry the first data, the second data, and the third data up to a first node point. In one aspect, a location of the first node point may be based on location information of the first processor, the second processor, and the third processor. In another aspect, the location of the first node point may be based on a number of all processors and location information of all processors. Beyond the first node point, the first merged pipeline communication bus may split into a first pipeline communication bus configured for the first processor and a second merged pipeline communication bus configured for the second processor and the third processor.

The first pipeline communication bus may carry the first data to the first processor.

The second merged pipeline communication bus may carry the second data and the third data up to a second node point. In one aspect, a location of the second node point may be based on location information of the second processor and the third processor. In another aspect, the location of the second node point may be based on a number of all processors and location information of all processors. Beyond the second node point, the second merged pipeline communication bus may split into a second pipeline communication bus configured for the second processor and a third pipeline communication bus configured for the third processor. The second pipeline communication bus may carry the second data to the second processor. The third pipeline communication bus may carry the third data to the third processor.

Example Method for Optimization of Pipeline Communication Buses

Figure 10:
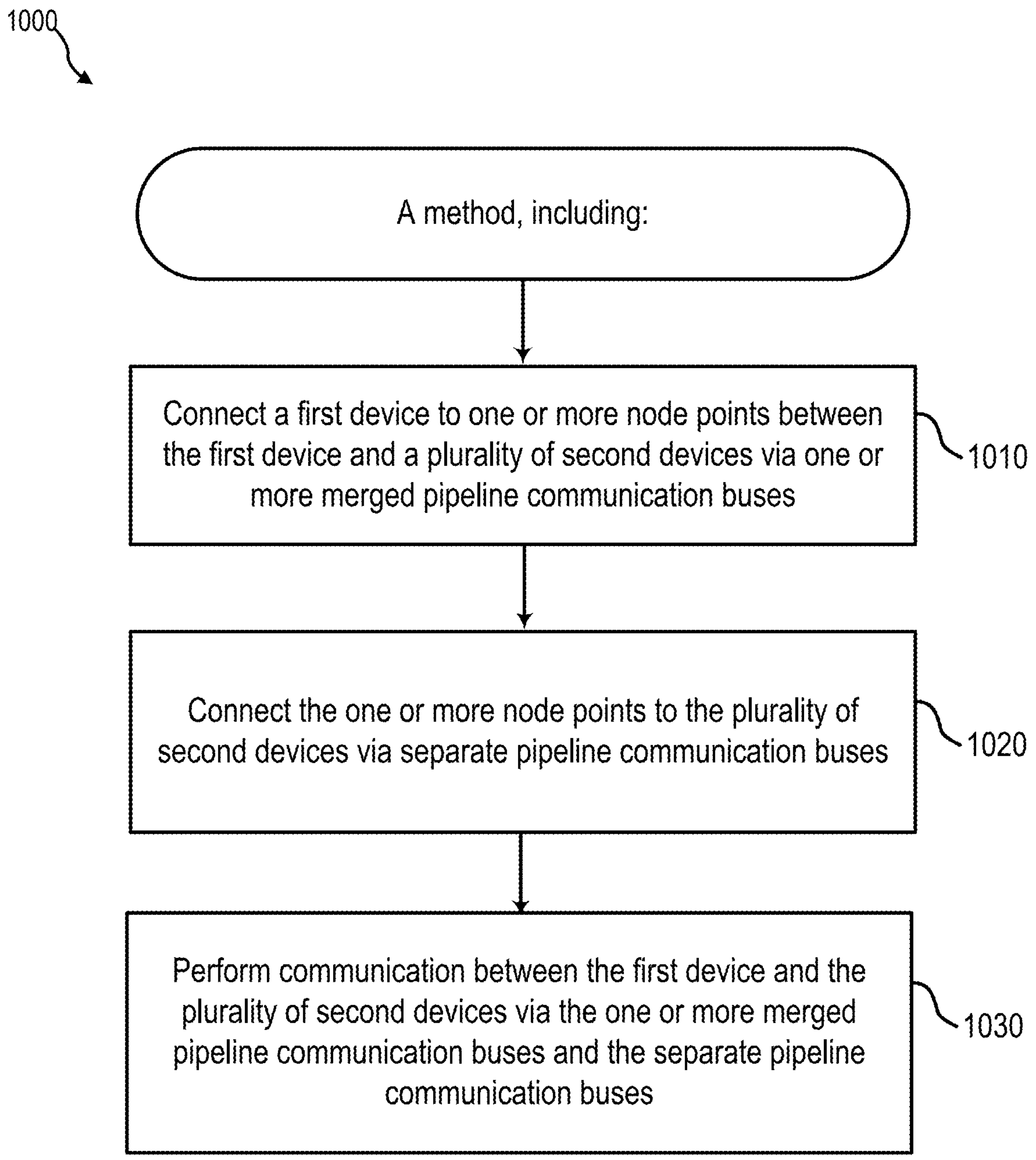
FIG. 10 depicts a method for managing optimization of pipeline communication buses being used in data transfer architectures, in accordance with certain aspects of the present disclosure.

FIG. 10 depicts a method 1000 for managing optimization of pipeline communication buses being used in data transfer architectures in an electronic system.

The method 1000 begins at 1010 with connecting a first device to one or more node points between the first device and a plurality of second devices via one or more merged pipeline communication buses.

The method 1000 at 1020 includes connecting the one or more node points to the plurality of second devices via separate pipeline communication buses.

The method 1000 at 1030 includes performing communication between the first device and the plurality of second devices via the one or more merged pipeline communication buses and the separate pipeline communication buses.

In certain aspects, each merged pipeline communication bus carries data corresponding to two or more of the plurality of second devices. In certain aspects, each separate pipeline communication bus carries data corresponding to one of the plurality of second devices.

In certain aspects, the first device may correspond to a processor and the plurality of second devices may correspond to a plurality of memory devices.

In certain aspects, the first device may correspond to a memory device and the plurality of second devices may correspond to a plurality of processors.

In certain aspects, a quantity of the one or more node points may be less than a quantity of the plurality of second devices.

The method 1000 further includes determining a quantity of the one or more node points and the one or more merged pipeline communication buses based on a quantity of the plurality of second devices and location information associated with the plurality of second devices.

The method 1000 further includes configuring each of the one or more node points and the one or more merged pipeline communication buses for the two or more of the plurality of second devices that are proximate to each other.

The method 1000 further includes transmitting information by the first device to the plurality of second devices via the one or more merged pipeline communication buses and the separate pipeline communication buses.

The method 1000 further includes receiving information by the first device from the plurality of second devices via the one or more merged pipeline communication buses and the separate pipeline communication buses.

In certain aspects, each of the one or more merged pipeline communication buses may include one or more merged pipeline flip-flops and each merged pipeline flip-flop may be associated with the two or more of the plurality of second devices. In certain aspects, each of the separate pipeline communication buses may include one or more separate pipeline flip-flops and each separate pipeline flip-flop may be associated with the one of the plurality of second devices.

The method 1000 further includes enabling the one or more separate pipeline flip-flops using one or more clock signals.

The method 1000 further includes enabling the one or more merged pipeline flip-flops using one or more clock signals.

The method 1000 further includes determining to transmit data packets from the first device to one of the plurality of second devices. The method 1000 further includes enabling the one or more merged pipeline flip-flops on the one or more merged pipeline communication buses and the one or more separate pipeline flip-flops on a separate pipeline communication bus connecting the first device to the one of the plurality of second devices using one or more clock signals to allow transmission of the data packets from the first device to the one of the plurality of second devices.

The method 1000 further includes disabling the one or more merged pipeline flip-flops on the one or more merged pipeline communication buses and the one or more separate pipeline flip-flops on the separate pipeline communication bus connecting the first device to the one of the plurality of second devices after transmission of the data packets from the first device to the one of the plurality of second devices is completed.

The method 1000 may result in better electronic system area utilization (e.g., as less number of data routing resources are needed), better performance (e.g., as less number of signal routes are needed that may afford to have a better width and spacing for used signal routes to achieve a higher performance), and better leakage power (as less number of flip-flops and other circuits are needed).

Note that FIG. 10 is just one example of a method, and other methods including fewer, additional, or alternative steps are possible consistent with this disclosure.

EXAMPLE CLAUSES

Implementation examples are described in the following numbered clauses:

Clause 1: A method, including: connecting a first device to one or more node points between the first device and a plurality of second devices via one or more merged pipeline communication buses; connecting the one or more node points to the plurality of second devices via separate pipeline communication buses; and performing communication between the first device and the plurality of second devices via the one or more merged pipeline communication buses and the separate pipeline communication buses.

Clause 2: The method of clause 1, wherein: each merged pipeline communication bus carries data corresponding to two or more of the plurality of second devices; and each separate pipeline communication bus carries data corresponding to one of the plurality of second devices.

Clause 3: The method of any one of clauses 1-2, wherein: the first device corresponds to a processor; and the plurality of second devices correspond to a plurality of memory devices.

Clause 4: The method of any one of clauses 1-3, wherein: the first device corresponds to a memory device; and the plurality of second devices correspond to a plurality of processors.

Clause 5: The method of any one of clauses 1-4, wherein a quantity of the one or more node points is less than a quantity of the plurality of second devices.

Clause 6: The method of any one of clauses 1-5, further including determining a quantity of the one or more node points and the one or more merged pipeline communication buses based on a quantity of the plurality of second devices and location information associated with the plurality of second devices.

Clause 7: The method of any one of clauses 1-6, further including configuring each of the one or more node points and the one or more merged pipeline communication buses for the two or more of the plurality of second devices that are proximate to each other.

Clause 8: The method of any one of clauses 1-7, wherein the performing includes transmitting information by the first device to the plurality of second devices via the one or more merged pipeline communication buses and the separate pipeline communication buses.

Clause 9: The method of any one of clauses 1-8, wherein the performing includes receiving information by the first device from the plurality of second devices via the one or more merged pipeline communication buses and the separate pipeline communication buses.

Clause 10: The method of any one of clauses 1-9, wherein: each of the one or more merged pipeline communication buses includes one or more merged pipeline flip-flops, each merged pipeline flip-flop is associated with the two or more of the plurality of second devices; and each of the separate pipeline communication buses includes one or more separate pipeline flip-flops, each separate pipeline flip-flop is associated with the one of the plurality of second devices.

Clause 11: The method of clause 10, further including enabling the one or more separate pipeline flip-flops using one or more clock signals.

Clause 12: The method of clause 10, further including enabling the one or more merged pipeline flip-flops using one or more clock signals.

Clause 13: The method of clause 10, further including: determining to transmit data packets from the first device to one of the plurality of second devices; and enabling the one or more merged pipeline flip-flops on the one or more merged pipeline communication buses and the one or more separate pipeline flip-flops on a separate pipeline communication bus connecting the first device to the one of the plurality of second devices using one or more clock signals to allow transmission of the data packets from the first device to the one of the plurality of second devices.

Clause 14: The method of clause 13, further including disabling the one or more merged pipeline flip-flops on the one or more merged pipeline communication buses and the one or more separate pipeline flip-flops on the separate pipeline communication bus connecting the first device to the one of the plurality of second devices after transmission of the data packets from the first device to the one of the plurality of second devices is completed.

Clause 15: An apparatus, including: at least one memory including instructions; and one or more processors configured, individually or in any combination, to execute the instructions and cause the apparatus to perform a method in accordance with any one of Clauses 1-14.

Clause 16: An apparatus, including means for performing a method in accordance with any one of Clauses 1-14.

Clause 17: A non-transitory computer-readable medium including executable instructions that, when executed by one or more processors of an apparatus, cause the apparatus to perform a method in accordance with any one of Clauses 1-14.

Clause 18: A computer program product embodied on a computer-readable storage medium including code for performing a method in accordance with any one of Clauses 1-14.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method, comprising:

connecting a first device to one or more node points between the first device and a plurality of second devices via one or more merged pipeline communication buses;

connecting the one or more node points to the plurality of second devices via separate pipeline communication buses;

performing communication between the first device and the plurality of second devices via the one or more merged pipeline communication buses and the separate pipeline communication buses; and determining a quantity of the one or more node points and the one or more merged pipeline communication buses based on a quantity of the plurality of second devices and location information associated with the plurality of second devices.

2. The method of claim 1, wherein:

each merged pipeline communication bus carries data corresponding to two or more of the plurality of second devices; and each separate pipeline communication bus carries data corresponding to one of the plurality of second devices.

3. The method of claim 1, wherein:

the first device corresponds to a processor; and the plurality of second devices correspond to a plurality of memory devices.

4. The method of claim 1, wherein:

the first device corresponds to a memory device; and the plurality of second devices correspond to a plurality of processors.

5. The method of claim 1, wherein a quantity of the one or more node points is less than a quantity of the plurality of second devices.

6. The method of claim 1, further comprising configuring each of the one or more node points and the one or more merged pipeline communication buses for the two or more of the plurality of second devices that are proximate to each other.

7. The method of claim 1, wherein the performing comprises transmitting information by the first device to the plurality of second devices via the one or more merged pipeline communication buses and the separate pipeline communication buses.

8. The method of claim 1, wherein the performing comprises receiving information by the first device from the plurality of second devices via the one or more merged pipeline communication buses and the separate pipeline communication buses.

9. The method of claim 1, wherein:

each of the one or more merged pipeline communication buses comprises one or more merged pipeline flip-flops, each merged pipeline flip-flop is associated with the two or more of the plurality of second devices; and each of the separate pipeline communication buses comprises one or more separate pipeline flip-flops, each separate pipeline flip-flop is associated with the one of the plurality of second devices.

10. The method of claim 9, further comprising enabling the one or more separate pipeline flip-flops using one or more clock signals.

11. The method of claim 9, further comprising enabling the one or more merged pipeline flip-flops using one or more clock signals.

12. The method of claim 9, further comprising:

determining to transmit data packets from the first device to one of the plurality of second devices; and enabling the one or more merged pipeline flip-flops on the one or more merged pipeline communication buses and the one or more separate pipeline flip-flops on a separate pipeline communication bus connecting the first device to the one of the plurality of second devices using one or more clock signals to allow transmission of the data packets from the first device to the one of the plurality of second devices.

13. The method of claim 12, further comprising disabling the one or more merged pipeline flip-flops on the one or more merged pipeline communication buses and the one or more separate pipeline flip-flops on the separate pipeline communication bus connecting the first device to the one of the plurality of second devices after transmission of the data packets from the first device to the one of the plurality of second devices is completed.

14. An apparatus, comprising:

a memory comprising instructions; and one or more processors, individually or collectively, configured to execute the instructions and cause the apparatus to:

connect a first device to one or more node points between the first device and a plurality of second devices via one or more merged pipeline communication buses;

connect the one or more node points to the plurality of second devices via separate pipeline communication buses;

perform communication between the first device and the plurality of second devices via the one or more merged pipeline communication buses and the separate pipeline communication buses; and determine a quantity of the one or more node points and the one or more merged pipeline communication buses based on a quantity of the plurality of second devices and location information associated with the plurality of second devices.

15. The apparatus of claim 14, wherein:

each merged pipeline communication bus carries data corresponding to two or more of the plurality of second devices; and each separate pipeline communication bus carries data corresponding to one of the plurality of second devices.

16. The apparatus of claim 14, wherein:

the first device corresponds to a processor; and the plurality of second devices correspond to a plurality of memory devices.

17. The apparatus of claim 14, wherein:

the first device corresponds to a memory device; and the plurality of second devices correspond to a plurality of processors.

18. The apparatus of claim 14, wherein a quantity of the one or more node points is less than a quantity of the plurality of second devices.

19. A non-transitory computer-readable medium comprising instructions that, when executed by one or more processors, cause the one or more processors to perform a method, comprising:

connecting a first device to one or more node points between the first device and a plurality of second devices via one or more merged pipeline communication buses;

connecting the one or more node points to the plurality of second devices via separate pipeline communication buses;

performing communication between the first device and the plurality of second devices via the one or more merged pipeline communication buses and the separate pipeline communication buses; and determining a quantity of the one or more node points and the one or more merged pipeline communication buses based on a quantity of the plurality of second devices and location information associated with the plurality of second devices.

* * * * *